United States Patent
Liszkai et al.

(10) Patent No.: US 10,395,782 B2
(45) Date of Patent: Aug. 27, 2019

(54) REACTOR MODULE SUPPORT STRUCTURE

(71) Applicant: NuScale Power, LLC, Corvallis, OR (US)

(72) Inventors: Tamas Liszkai, Corvallis, OR (US); Heqin Xu, Corvallis, OR (US); Matthew Snyder, Corvallis, OR (US); William Koski, Corvallis, OR (US)

(73) Assignee: NUSCALE POWER, LLC, Corvallis, OR (US)

( * ) Notice: Subject to any disclaimer, the term of this patent is extended or adjusted under 35 U.S.C. 154(b) by 517 days.

(21) Appl. No.: 14/662,059

(22) Filed: Mar. 18, 2015

(65) Prior Publication Data

US 2016/0276046 A1    Sep. 22, 2016

(51) Int. Cl.
| | |
|---|---|
| *G21C 13/024* | (2006.01) |
| *G21C 9/04* | (2006.01) |
| *G21C 1/32* | (2006.01) |
| *G21C 9/00* | (2006.01) |

(52) U.S. Cl.
CPC ............ *G21C 13/024* (2013.01); *G21C 9/04* (2013.01); *G21C 1/32* (2013.01); *G21C 9/00* (2013.01); *G21Y 2002/50* (2013.01); *G21Y 2004/30* (2013.01); *Y02E 30/40* (2013.01)

(58) Field of Classification Search
CPC ........... G21C 13/024; G21C 9/04; G21C 5/10
See application file for complete search history.

(56) References Cited

U.S. PATENT DOCUMENTS

| | | | | |
|---|---|---|---|---|
| 2,890,009 A | * | 6/1959 | Chapellier | F16M 5/00 248/146 |
| 3,129,836 A | * | 4/1964 | Frevel | B01J 19/0053 206/521 |

(Continued)

FOREIGN PATENT DOCUMENTS

| | | |
|---|---|---|
| CN | 103474105 A | 12/2013 |
| CN | 203338768 U | 12/2013 |

(Continued)

OTHER PUBLICATIONS

International Preliminary Report on Patentability for PCT/US2016/018526; dated Sep. 19, 2017; 9 pages.

(Continued)

*Primary Examiner* — Sharon M Davis
(74) *Attorney, Agent, or Firm* — Schwabe Williamson & Wyat

(57) ABSTRACT

A support structure for attenuating seismic forces in one or more reactor modules housed in a reactor building includes a mounting structure that may be configured to securely connect the support structure to a floor of the reactor building. A receiving area may be sized to receive a lower portion of a reactor module, and the support structure may be configured to at least partially surround the lower portion of the reactor module within the receiving area. The support structure may further include a retention system located near a top surface of the support structure. The retention system may be configured to contact the reactor module during a seismic event, and an upper portion of the reactor module may extend above the retention system without contacting the support structure.

20 Claims, 13 Drawing Sheets

(56) References Cited

U.S. PATENT DOCUMENTS

| | | | | | |
|---|---|---|---|---|---|
| 3,775,250 | A | * | 11/1973 | Scholz | G21C 13/024 376/293 |
| 3,916,944 | A | * | 11/1975 | Crawford | F16L 3/16 137/376 |
| 4,115,194 | A | * | 9/1978 | Butti | G21C 13/024 376/285 |
| 4,581,199 | A | * | 4/1986 | Bioret | E04H 9/021 254/93 R |
| 4,744,941 | A | * | 5/1988 | Becher | G21C 9/04 376/285 |
| 2010/0124304 | A1 | * | 5/2010 | Nylander | G21C 1/322 376/293 |
| 2013/0301786 | A1 | * | 11/2013 | Shargots | G21C 13/02 376/353 |

FOREIGN PATENT DOCUMENTS

| | | |
|---|---|---|
| JP | 3462911 B2 | 11/2003 |
| JP | 2010185787 A | 8/2010 |
| JP | 2011053084 A | 3/2011 |
| WO | 2008/082235 A1 | 7/2008 |
| WO | 2010/057210 A1 | 5/2010 |

OTHER PUBLICATIONS

International Search Report and Written Opinion for PCT/US2016/018526; dated Jun. 2, 2016; 15 pages.

* cited by examiner

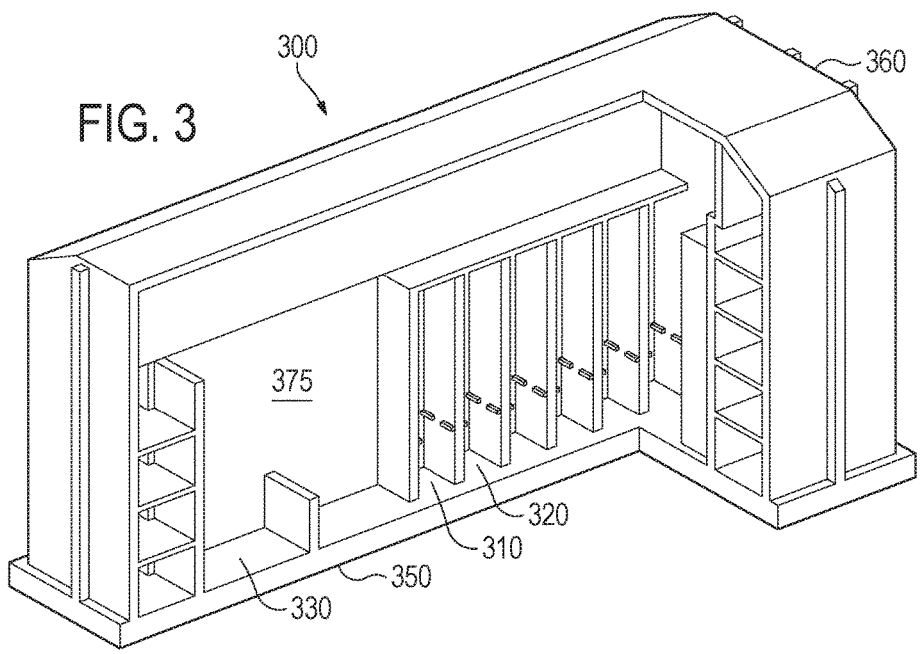
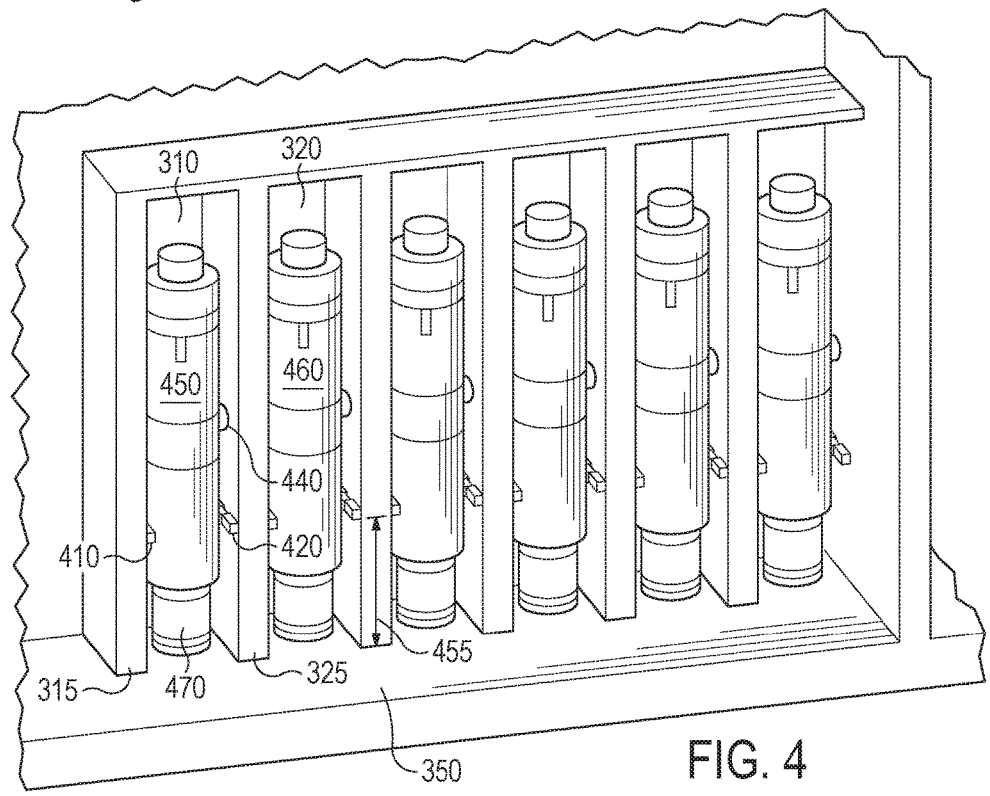

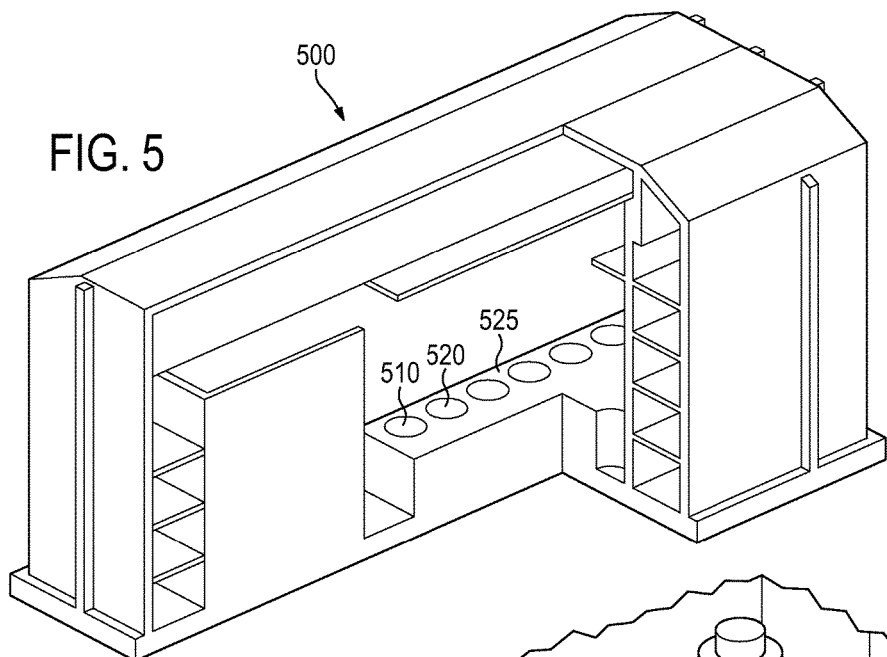
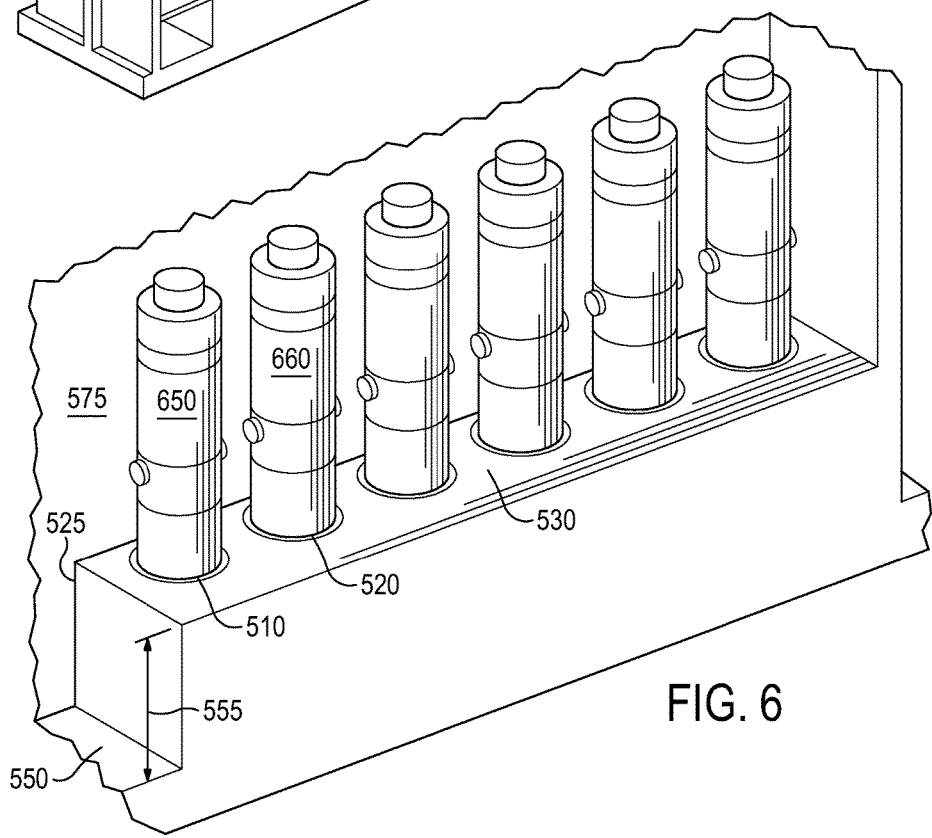

REACTOR MODULE SUPPORT STRUCTURE

GOVERNMENT INTEREST

This invention was made with Government support under Contract No. DE-NE0000633 awarded by the Department of Energy. The Government has certain rights in this invention.

TECHNICAL FIELD

This disclosure generally relates to systems, devices, structures, and methods for supporting a reactor module and/or attenuating dynamic forces in a nuclear reactor system.

BACKGROUND

Seismic isolation may be utilized to control or reduce the response of a component or structure to vertical and horizontal ground-input motions or accelerations. Seismic isolation may accomplish this by decoupling the motion of the component/structure from the driving motion of the substructure. In some instances, hardware (e.g., springs) may be positioned between the substructure and superstructure. Use of such hardware may minimize the dynamic response of the structure by increasing the fundamental period of vibration for the component or structure, resulting in lower in-structure accelerations and forces. To further reduce spectral response amplitudes (e.g., deflections, forces, etc.), other mechanisms may be employed that effectively reduce the peak amplitude to manageable levels.

Piping and other connections may be provided between a nuclear reactor and a secondary cooling system or other systems in the power generation facility. In the event of an earthquake or other seismic activity, significant forces or vibration may be transferred to, or by, the connections, which can place great stress on the connections. Forces resulting from thermal expansion also place stress on the connections. Maintaining integrity of these connections helps discourage the inadvertent release of radioactive or other materials from the various systems, and reduces maintenance or damage that might otherwise occur if one or more of the connections fail.

During a seismic event, dynamic and/or seismic forces may be transmitted from the ground, support surface, or surrounding reactor building to a reactor module. The seismic forces which are transferred to the reactor module may experience a cumulative increase and/or amplification in amplitude and/or frequency depending on the number and/or length of intervening structures and/or systems that the seismic forces travel in reaching the reactor module. If the seismic forces become large enough, the reactor core and/or fuel elements may be damaged.

The present invention addresses these and other problems.

BRIEF DESCRIPTION OF THE DRAWINGS

FIG. 3 illustrates an example reactor building comprising a plurality of reactor bays.

FIG. 4 illustrates a number of reactor modules housed in the reactor building of FIG. 3.

FIG. 5 illustrates an example support structure for one or more reactor modules.

FIG. 6 illustrates a plurality of reactor modules housed in the example support structure of FIG. 5.

DETAILED DESCRIPTION

Figure 1:
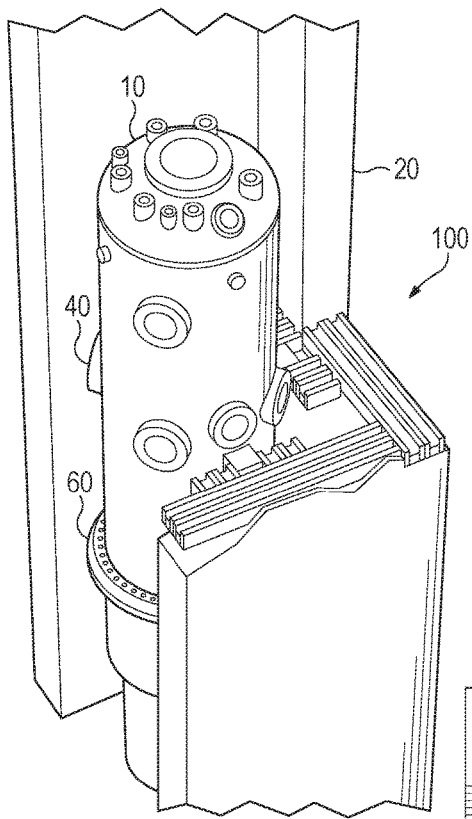
FIG. 1 illustrates an elevated perspective view of an example support structure for a reactor module.

FIG. 1 illustrates an elevated perspective view of an example support structure 100 for a reactor module 10. Reactor module 10 may comprise a pressurized reactor vessel housed in a containment vessel. Both the reactor vessel and containment vessel may be made out of steel. In some examples, the exterior surface of reactor module 10 may primarily comprise the containment vessel, and the reactor vessel may be hidden from external view, being located within the surrounding containment vessel. One or both of the reactor vessel and the containment vessel may comprise a substantially capsule-shaped internal and/or external surface.

Reactor module 10 is shown located within a reactor bay 20 comprising three or more walls which at least partially surround reactor module 10. Reactor module 10 may comprise one or more steam generator connections 40 or access ports and a containment vessel flange 60. Steam generator connections 40 may comprise one or more upper connections or steam outlets of a steam generator system. In some examples, one or more lower connections or coolant entries of the steam generator system may be located intermediate steam generator connections 40 and containment vessel flange 60.

Containment vessel flange 60 may comprise a flanged structure or weldment associated with mounting a lower containment head to a body of reactor module 10. The lower containment head or lower portion of reactor module 10 located below flange 60 may be approximately one-third as long as the overall height of reactor module 10. Similarly, the upper portion of reactor module 10 located above flange 60 may be approximately two-thirds as long as the overall height of reactor module 10.

The upper portion of reactor module 10 may comprise an upper containment head welded to the body of reactor module 10. In some examples, a flange similar to flange 60 may be used to mount the upper containment head to the body of reactor module 10 in addition to, or instead of, flange 60 being used to mount the lower containment head to the body of reactor module 10. Additionally, the lower containment head of reactor module 10 may be supported on the floor of reactor bay 20 by a base structure configured to support some or substantially all of the weight of reactor module 10.

Support structure 100 may comprise one or more support members which extend from the one or more walls of reactor bay 20 towards reactor module 10. The support members may be located at an approximate height of steam generator connections 40. The one or more steam generator connections 40 and/or the support members of support structure 100 may be located above containment vessel flange 60. In some examples, the support members may be located at a height which is intermediate steam generator connections 40 and containment vessel flange 60.

Figure 2:
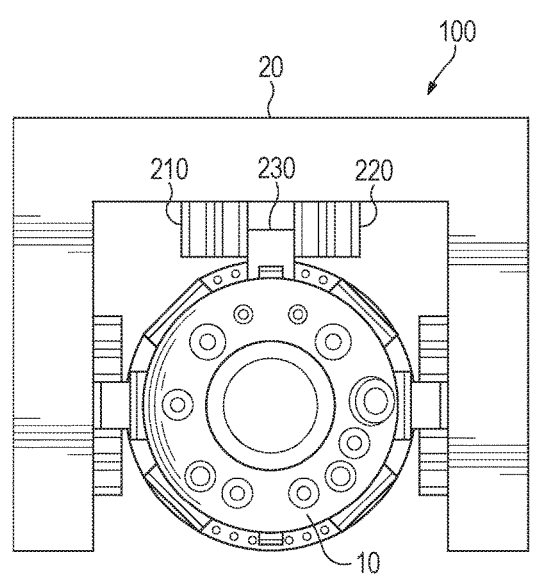
FIG. 2 illustrates a top view of the example support structure of FIG. 1

FIG. 2 illustrates a top view of the example support structure 100 of FIG. 1. Reactor module 10 may comprise one or more radial extensions 230 configured as keys, lugs, bosses, stubs, other types of protruding features, or any combination thereof. Radial extension 230 may comprise one or more mating surfaces which are configured to contact at least a portion of support structure 100 during a seismic or dynamic force condition. For example, radial extension 230 may be configured to fit in between two or more members of support structure 100, such as a first support member 210 and a second support member 220.

First support member 210 and/or second support member 220 may be configured to prohibit, restrain, or restrict a circumferential rotation of reactor module 10 about its longitudinal axis. Additionally, first support member 210 and/or second support member 220 may be configured to prohibit, restrain, or restrict a radial movement of reactor module 10 towards one or more walls of reactor bay 20. In some examples, support structure 100 may comprise one or more damping or attenuation devices configured to reduce the amount of force, acceleration, or vibration experienced by reactor module 10 or any components associated with reactor module 10, such as a fuel assembly, a control rod drive mechanism, piping, etc.

Reactor module 10 may be at least partially submerged in liquid. For example, reactor bay 20 may be configured to house a pool of water. The pool of water may operate as an ultimate heat sink for reactor module 10. During a seismic event, multiple resonance frequencies in a wide range of the frequency spectrum may be transmitted to reactor module 10 via support structure 100.

FIG. 3 illustrates an example reactor building 300 comprising a plurality of reactor bays, such as a first reactor bay 310 and a second reactor bay 320. In some examples, reactor building 300 may comprise between six and twelve reactor bays. Reactor building 300 may comprise a shared reactor pool 375 configured to house a pool of water that at least partially surrounds one or more reactor modules housed in the reactor bays. Additionally, reactor pool 375 may extend over a spent fuel storage area 330 located within reactor building 300.

The bottom of reactor pool 375 may be bounded by a reactor building floor 350. Reactor building floor 350 may comprise steel-reinforced concrete located on or in the ground. In some examples, an upper surface 360 of reactor building 300 may be approximately located at ground level, such that some or all of reactor pool 375 may be located below the ground surface. Similarly, reactor building floor 350 may be configured as a subterranean structure and may be located below ground by as much as thirty feet or more.

Reactor building 300 may comprise a crane or other hoisting device configured to lift and/or move a reactor module housed in the reactor bays. For example, the crane may be configured to move an off-line reactor module from first reactor bay 310 to a refueling station. In some examples, the refueling station may also be located within reactor pool 375 such that the reactor module remains at least partially submerged in the pool of water throughout a refueling procedure.

FIG. 4 illustrates a number of reactor modules housed in the reactor building 300 of FIG. 3, including a first reactor module 450 housed in first reactor bay 310 and a second reactor module 460 housed in second reactor bay 320. First reactor bay 310 may comprise an outer wall 315 and an intermediate wall 325. Intermediate wall 325 may separate first reactor bay 310 from second reactor bay 320. In some examples, intermediate wall 325 may form a part of both first reactor bay 310 and second reactor bay 320.

A first load-bearing support 410 may be associated with outer wall 315 and a second load-bearing support 420 may be associated with intermediate wall 325. First reactor module 450 may be located between first load-bearing support 410 and second load-bearing support 420. First load-bearing support 410 and/or second load-bearing support 420 may be configured similarly as the support members of support structure 100 (FIG. 2). In other examples, first load-bearing support 410 and second load-bearing support 420 may comprise the ends of a partial support ring or "c-ring" which may be configured to partially surround first reactor module 450. One or both of first load-bearing support 410 and second load-bearing support 420 may be configured to be retracted, rotated, or otherwise moved to allow first reactor module 450 to be removed from, or installed into, first reactor bay 310.

In some examples, first load-bearing support 410 may be operably connected to one or both of outer wall 315 and first reactor module 450. Similarly, second load-bearing support 420 may be operably connected to one or both of intermediate wall 325 and first reactor module 450. One or both of first load-bearing support 410 and second load-bearing support 420 may be configured to prohibit, restrain, or restrict a radial movement and/or a circumferential rotation of first reactor module 310.

First reactor module 310 may be configured to be supported on reactor building floor 350 by a base structure 470. The base structure 470 may be configured as a skirt or a substantially cylindrical structure that supports the weight of first reactor module 310 in a vertical direction. In some examples, base structure 470 may further be configured to prohibit, restrain, or restrict a radial movement and/or a circumferential rotation of first reactor module 310. Additionally, base structure 470 may be configured similarly as one or more of the example base structures and/or base skirts as disclosed in U.S. application Ser. No. 14/528,123 entitled SEISMIC ATTENUATION SYSTEM FOR A NUCLEAR REACTOR, which was filed on Oct. 30, 2014 and is herein incorporated by reference in its entirety.

First load-bearing support 410 and/or second load-bearing support 420 may be positioned at an elevation that is below one or more steam generator connections 440 or access ports associated with first reactor module 450. In some examples, first load-bearing support 410 and/or second load-bearing support 420 may be approximately positioned at a support height 455 corresponding with the approximate height of a containment vessel flange of first reactor module 450. Support height 455 may be located at or between approximately one-fourth to one-half of the overall height of first reactor module 450. In some examples, support height 455 may be approximately one-third of the overall height of first reactor module 450.

An example containment vessel flange 60 of a reactor module is illustrated at FIG. 1. The containment vessel flange may be designed to be very rigid so that it can easily carry any horizontal loads transmitted by first load-bearing support 410 and/or second load-bearing support 420 without additional reinforcement of the reactor module. An upper portion of first reactor module 450 located above the flange may extend above first load-bearing support 410 and/or second load-bearing support 420 without contacting either outer wall 315 or intermediate wall 325 of the reactor building and/or reactor bay.

In some examples, substantially all seismic and/or dynamic forces experienced by the reactor building or by the associated reactor bay may be transmitted to first reactor module 410 via first load-bearing support 410, second load-bearing support 420, and base structure 470, or any combination thereof. By locating first load-bearing support 410 and second load-bearing support 420 at or near the containment vessel flange, any seismic and/or dynamic forces transmitted to first reactor module 450 may occur at a position or vertical height of first reactor module 450 which is lower than the where the forces would be transmitted to reactor module 10 via support structure 100 (FIG. 2).

By selecting the position, location, or height where any seismic or dynamic forces may be transmitted to the reactor module, the frequencies, amplitudes, and/or accelerations associated with the forces may be controllably modified or controlled with respect to various or select components associated with the reactor module. Lowering the effective force transmission points closer to reactor building floor 350 may create a smaller moment arm relative to base structure 470 for any forces transmitted from first reactor bay 310 to first reactor module 450.

FIG. 5 illustrates an example support structure 525 for one or more reactor modules. Support structure 525 may be configured as a multi-modular support structure comprising a plurality of receiving areas operable to hold a plurality of reactor modules. For example, support structure 525 may comprise a first recess 510 or cavity configured to hold a first reactor module and a second recess 520 may be configured to hold a second reactor module. In some examples, some or all of support structure 525 may be formed from steel-reinforced concrete.

First recess 510 and/or second recess 520 may be configured as a substantially round or cylindrical hole formed in or through support structure 525. The diameter associated with the hole may be slightly greater than the diameter of a corresponding reactor module. In some examples, support structure 525 may be configured to hold as many as six to twelve reactor modules.

FIG. 6 illustrates a plurality of reactor modules housed in the example support structure 525 of FIG. 5. Support structure 525 may be located on a reactor building floor 550. A first reactor module 650 is shown located in first recess 510 and a second reactor module 660 is shown located in second recess 520. First reactor module 650 may be separated from second reactor module 660 according to the spacing between first recess 510 and second recess 520.

The portion of support structure 52 intermediate first recess 510 and second recess 520 that provides the spacing may be referred to as a ligament 530. Ligament 530 may be configured to connect a first receiving area, such as first recess 510, to a second receiving area, such as second recess 520. In some examples, ligament 530 may be configured to maintain a minimum spacing between first reactor module 550 and second reactor module 560.

The top surface of support structure 525 may be located at a support height 555 above reactor building floor 550. A portion of first reactor module 650 commensurate with support height 555 may be supported within support structure 525. In some examples, support height 555 may correspond to the approximate location of a containment vessel flange associated with first reactor module 650 and/or second reactor module 660. In other examples, support height 555 may correspond to one or more steam generator connections or access ports.

The weight of first reactor module 650 may be supported on reactor building floor 550 by a base support or support skirt located within support structure 525. In other examples, substantially all of the weight of first reactor module 650 may be supported by support structure 525 such that the lower head of first reactor module 650 may be suspended above the surface of reactor building floor 550, similar to an egg being supported by an egg carton.

Support structure 525 may comprise one or more internal flow channels configured to circulate liquid around and past the lower heads of the reactor modules in order, for example to remove heat generated during operation of the reactor modules. Additionally, support structure 525 may be connected to, or otherwise in contact with, a wall 575 of the reactor bays. In other examples, support structure 525 may be separated from, or seismically isolated from, wall 575 such that support structure 525 may only be in contact with the reactor building via reactor building floor 550.

Support structure 525 may be securely attached, mounted, bolted, welded, or otherwise connected to reactor building floor 550. In some examples, support structure 525 may be immovably connected to, or made structurally integral with, reactor building floor 550, such as by pouring and/or forming a concrete structure directly on, or concurrently with, reactor building floor 550.

First reactor module 650 and/or second reactor module 660 may be placed within support structure 525 without necessarily being attached to either support structure 525 or reactor building floor 550. Accordingly, one or both reactor modules 650, 660 may be repeatedly removed and/or installed into support structure 525, such as during one or more refueling operations. While first recess 510 and second recess 520 may comprise larger diameters than first reactor module 650 and second reactor module 660, respectively, contact between one or more of the reactor modules 650, 660 and support structure 525 may occur during a seismic event. The seismic event may cause one or both of the reactor modules 650, 660 to move slightly within support structure 525.

A retention system may be located near a top surface of support structure 525. In some examples, the inner surface or edge of first recess 510 and/or second recess 520 may comprise the retention system. The retention system may be configured to contact a lower portion of the reactor module during a seismic event. On the other hand, an upper portion of the reactor module may extend above the retention system without contacting support structure 525.

Figure 7:
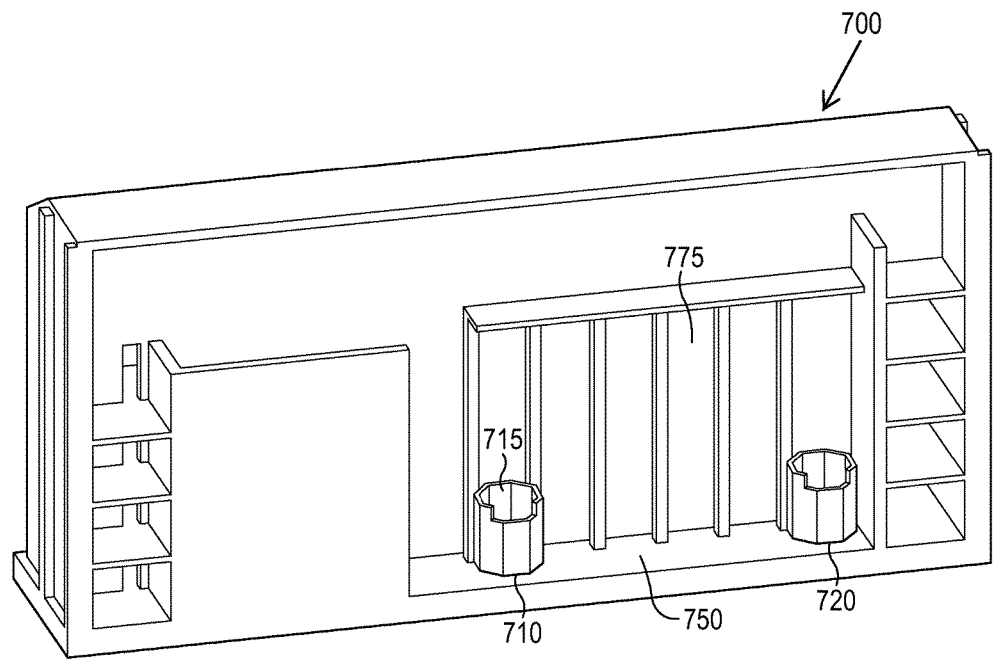
FIG. 7 illustrates an example support system for one or more reactor modules.

FIG. 7 illustrates an example support system 700 for one or more reactor modules, including a first support structure 710 and a second support structure 720. First support structure 710 may be configured to support a first reactor module, and second support structure 720 may be configured to support a second reactor module. First support structure 710 may comprise a cavity 715 configured to support the first reactor module. Cavity 715 may be roughly cylindrical in shape. In some examples, cavity 715 may comprise multiple sidewalls arranged in a geometric configuration, such as a pentagon, a hexagon, a heptagon, an octagon, etc.

First support structure 710 and/or second support structure 720 may be mounted to a reactor building floor 750. In some examples, a separate support structure may be provided for each reactor module provided in a multi-module reactor bay configuration. The reactor bay may comprise one or more reactor building walls 775. First support structure 710 and/or second support structure 720 may be attached to the one or more reactor building walls 775. In other examples, first support structure 710 and/or second support structure 720 may be physically separated some distance from all of the reactor building walls 775, such that the support structures(s) 710, 720 may only be physically supported by reactor building floor 750.

Physically separating first support structure 710 and/or second support structure 720 from reactor building walls 775 may operate to effectively decouple any excitation from reactor building walls 775 to the corresponding reactor modules during a seismic event. For example, first support structure 710 may be configured as a structure which is only, or exclusively, tied to reactor building floor 750. During the seismic event, the reactor building may have a number of different modes in the sensitive frequency range of components associated with the reactor module. By seismically isolating or decoupling the support structure(s) 710, 720 from reactor building walls 775, the peak accelerations experienced by reactor module 715, 725 may be limited to those transmitted from the corresponding support structure 710, 720, respectively.

Figure 8A:
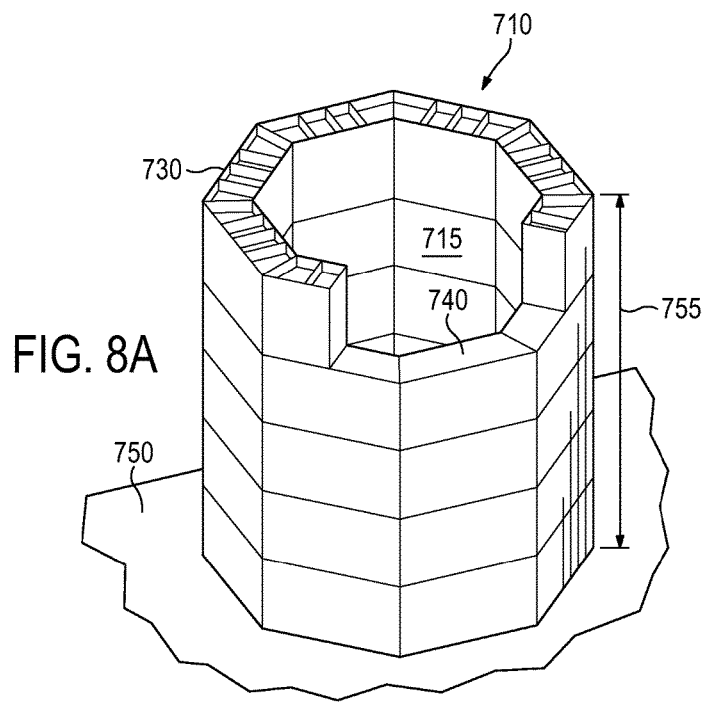
FIG. 8A illustrates an enlarged view of an example support structure for an individual reactor module.

FIG. 8A illustrates an enlarged view of example support structure, such as first support structure 710 of FIG. 7, which may be configured to support an individual reactor module. Support structure 710 may comprise an enclosure 730 comprising one or more walls. The top surface of enclosure 730 may be located at a support height 755 above reactor building floor 750. A portion of a reactor module commensurate with support height 755 may be housed within support structure 710.

Support height 755 may correspond to the approximate location of a containment vessel flange associated with the reactor module contained within support structure 710. Restraint against uplift of the reactor module within support structure 710 may be achieved by providing a restraining device that is configured to engage the containment vessel flange to support structure 710. In some examples, support height 755 may correspond to one or more steam generator connections or access ports of the reactor module.

A reactor module may be supported on reactor building floor 750 by a support skirt located within support structure 710. In other examples, the weight of the reactor module may be supported by support structure 710 such that the lower head of first reactor module 650 is suspended above the surface of reactor building floor 750. Support structure 710 may comprise one or more flow channels configured to circulate liquid around and past the lower head of the reactor module in order to remove heat.

A partial opening 740 may be formed through enclosure 730. Partial opening 740 may be configured to provide a reduced height barrier for entry and/or removal of a reactor module into support structure 710. In some examples, a reactor building ceiling height and/or maximum available lifting height may limit the distance that a reactor module may be lifted away from reactor building floor 750, such as during a refueling operation. Partial opening 740 may facilitate the removal and/or insertion of the reactor module, by allowing the reactor module to be removed from support structure 710 while the bottom head of the reactor module is still at least partially below the top surface of enclosure 730.

A retention system may be located near a top surface of support structure 710. In some examples, the inner surface or edge of support structure 710 may comprise the retention system. The retention system may be configured to contact a lower portion of the reactor module during a seismic event. On the other hand, an upper portion of the reactor module may extend above the retention system without contacting support structure 710.

Cavity 715 may form a recessed area or a receiving area comprising a recessed space sized to fit a lower portion of a reactor module that is lowered into support structure 725. The recessed space may form a substantially cylindrical shaped receiving area that extends from a top surface of support structure 725 to reactor building floor 750. Cavity 715 may be formed and/or surrounded by five or more contiguous walls of support structure 725.

Figure 8B:
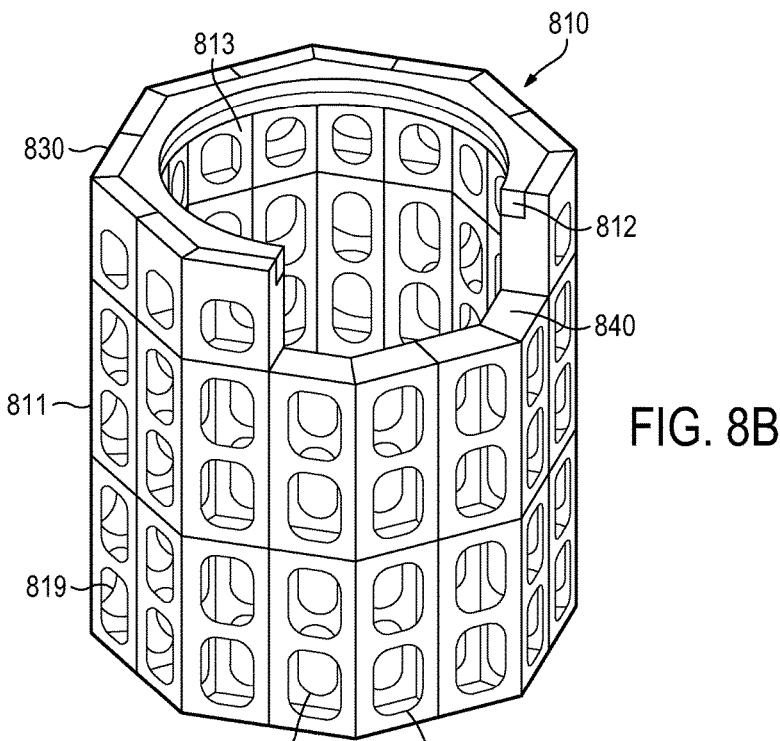
FIG. 8B illustrates an example support structure comprising a circumferential bumper.

FIG. 8B illustrates an example support structure 810 comprising a circumferential bumper 812. Bumper 812 may be located at or near the top surface of support structure 810, and may be configured to at least partially surround a containment vessel supported within. Support structure 810 may be configured similarly as support structure 710 of FIG. 8A, in that a partial opening 840 may be formed within an enclosure 830. In some examples, bumper 812 may be configured to provide a contact surface along the interior of enclosure 830 and terminate at either side of partial opening 840.

Partial opening 840 may comprise an opening through both enclosure 830 and bumper 812 to facilitate installation and/or removal of the containment vessel. Bumper 812 may be shaped as a semi-circular structure having a diameter slightly larger than that of the containment vessel supported within. The width of partial opening 840 is shown as being smaller than the diameter of the bumper 812.

Enclosure 830 may comprise a double-walled structure. An exterior wall 811 may form an exterior surface of enclosure 830, and an interior wall 813 may form an interior surface of enclosure 830. Interior wall 813 may be connected to exterior wall 811 by structural members 819. A plurality of through-holes, such as a first through-hole 815 and a second through-hole 817, may be configured to provide a passageway through one or both of exterior wall 811 and interior wall 813. Coolant or water located outside of enclosure 830 may pass through the plurality of through-holes into the interior of enclosure 830 to cool down the containment vessel located therein, before passing back out of the enclosure 830. Additionally, the plurality of through-holes, such as first through-hole 815, may be configured to allow emergency core cooling of the containment vessel.

The plurality of through-holes may be fluidly connected within the double-walled structure of enclosure 830. For example, multiple passageways may be formed between exterior wall 811 and interior wall 813 to interconnect first through-hole 815 with second through-hole 817. The multiple passageways may be formed past and/or through structural members 819, allowing coolant to circulate through the space located between exterior wall 811 and interior wall 813 of enclosure 830, and to facilitate heat removal from the containment vessel.

In some examples, bumper 812 may comprise and/or be attached to multiple sidewalls arranged in a geometric configuration, such as a pentagon, a hexagon, a heptagon, an octagon, etc. One or more walls of the geometric configuration may be at least partially removed to accommodate partial opening 840. For example, enclosure 830 is shown in FIG. 8B as comprising eight walls, and partial opening 840 is shown as extending at least partially through three of the walls. Similarly, bumper 812 is shown as being located along five full walls and two partial walls of enclosure 830. Each wall around enclosure 830 may comprise a plurality of through-holes, similar to first through-hole 815 and/or second through-hole 817.

Figure 8C:
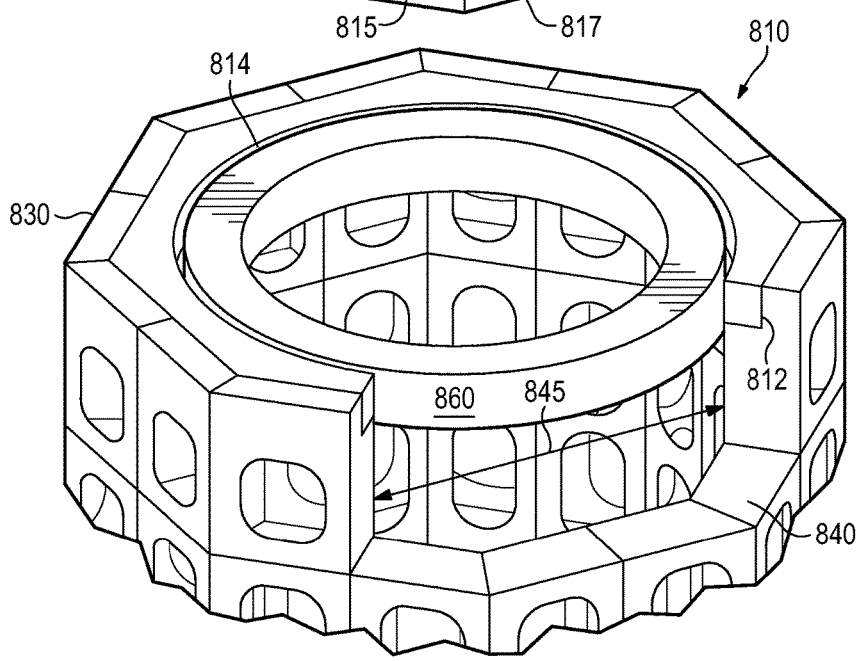
FIG. 8C illustrates the example support structure of FIG. 8B supporting a containment vessel flange.

FIG. 8C illustrates the example support structure 810 of FIG. 8B supporting a containment vessel flange 860. Containment vessel flange 860 is shown in isolation from the rest of the containment vessel for illustrative purposes only. In order to redistribute the load transmitted by and/or between support structure 810, bumper 812 may be configured to carry the seismic and/or dynamic loads from the containment vessel flange 860 in compression.

Containment vessel flange 860 may be located within support structure 810 such that a gap 814 exists between bumper 812 and containment vessel flange 860. For example, absent any substantial seismic and/or dynamic forces, gap 814 may be maintained such that no part of containment vessel flange 860 may come into direct contact with bumper 812. In some examples, no part of containment vessel flange 860 or the associated containment vessel may come into contact with any portion of support structure 810 when the containment vessel is not subjected to sufficient forces that would cause containment vessel flange 860 to move. Additionally, gap 814 may provide space to allow for thermal expansion of containment vessel flange 860 without contacting bumper 812.

The partial opening 840 may be sized such that containment vessel flange 860 will come into contact with bumper 812 regardless of the direction of forces acting on the containment vessel, even when the containment vessel is moved directly towards partial opening 840. The diameter of a lower portion of containment vessel may comprise a diameter that is less than width 845 to facilitate installation and/or removal of the containment vessel, e.g., with containment vessel flange 860 raised above bumper 812. In some examples, the width 845 of partial opening 840 may be approximately three-fourths the diameter of enclosure 830 or approximately three-fourths the diameter of containment vessel flange 860.

Figure 8D:
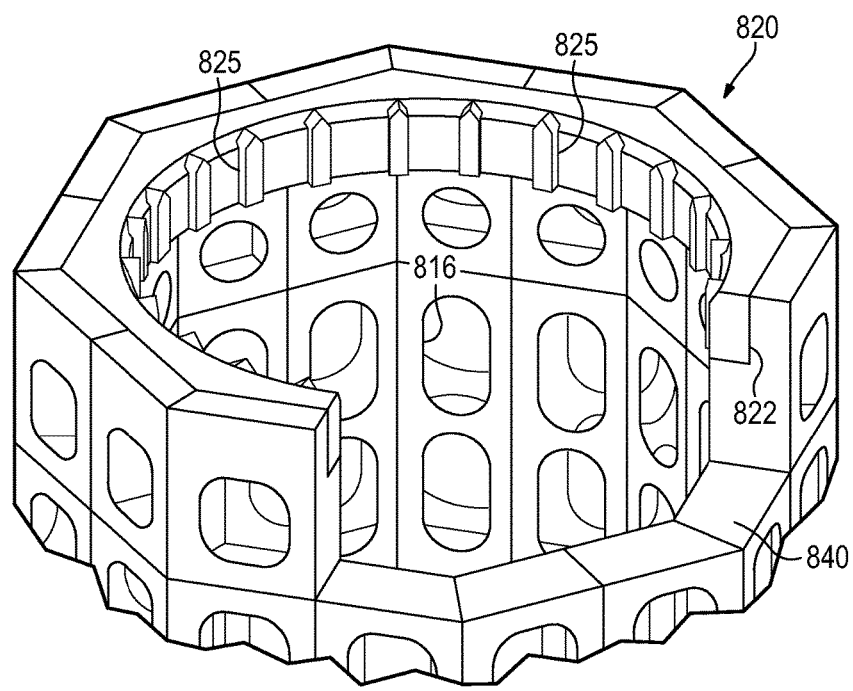
FIG. 8D illustrates an example support structure comprising a plurality of spaced apart stops.

FIG. 8D illustrates an example support structure 820 comprising a plurality of spaced apart stops 825. In some examples, stops 825 may project inward from a mounting structure 822 located at or near the top of support structure 820. Mounting structure 822 may be located in a similar position as bumper 812 of FIG. 8B. Similarly, stops 825 may be configured to function similarly as bumper 812, namely to provide support of a containment vessel.

Stops 825 may be spaced apart around the interior surface of support structure 820. In some examples, the series of stops 825 may terminate at either side of a partial opening 840, similar to the partial opening described at FIG. 8B. Additionally, support structure 820 may comprise a plurality of through-holes 816, similar to first through-hole 815 and second through-hole 817 of FIG. 8B.

Figure 8E:
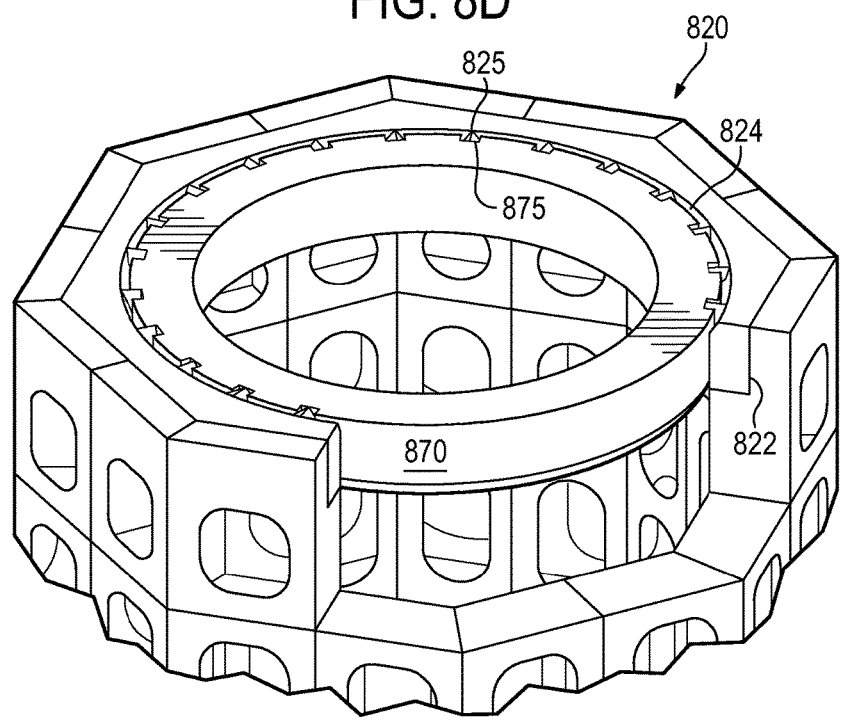
FIG. 8E illustrates the example support structure of FIG. 8D supporting a containment vessel flange.

FIG. 8E illustrates the example support structure 820 of FIG. 8D supporting a containment vessel flange 870. Containment vessel flange 870 is illustrated as comprising a number of slots 875. The number of slots 875 may equal the number of spaced-apart stops 825 projecting inward from mounting structure 822. In some examples, stops 825 may be configured as splines or keys which may be inserted into the slots 875 to form a splined connection. The splined connection may be configured to carry the seismic and/or dynamic loads in shear through the spline's teeth. Additionally, the splined connection may be configured to prevent spinning or rotation of the containment vessel within support structure 820.

Containment vessel flange 870 may be located within support structure 820 such that a gap 824 exists between mounting structure 822 and containment vessel flange 870. For example, absent any substantial seismic and/or dynamic forces, gap 824 may be maintained such that no part of containment vessel flange 870 may come into direct contact with mounting structure 822. In some examples, no part of containment vessel flange 870 or the associated containment vessel may come into contact with any portion of mounting structure 822 when the containment vessel is not subjected to sufficient forces that would cause containment vessel flange 870 to move.

Figure 8F:
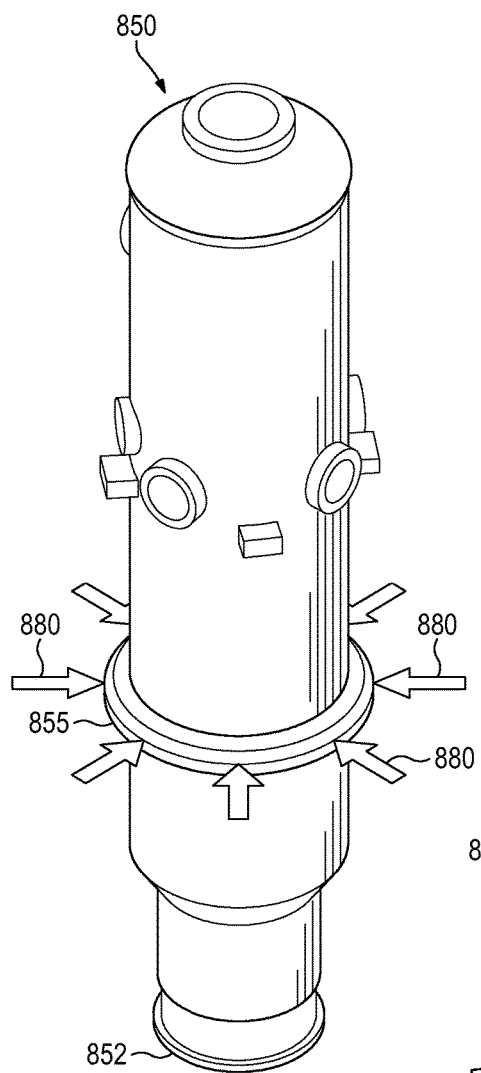
FIG. 8F illustrates an example containment vessel with flange.

FIG. 8F illustrates an example containment vessel 850 with a flange 855. Flange 855 may be configured to mount a removable end portion to the main body of containment vessel 850. The diameter of flange 855 may be larger than the diameter of the end portion, and may additionally be larger than the diameter of the main body of containment vessel 850. The end portion of containment vessel 850 may be supported on the ground by a base support 852. In some examples, base support 852 may be configured as a cylindrical skirt that rests on the ground.

Representative arrows illustrating dynamic forces 880 acting on the containment vessel 850 are shown at various locations around the circumference of flange 855. In some examples, dynamic forces 880 may act on containment vessel 850 in any direction along the plane intersecting flange 855.

Figure 8G:
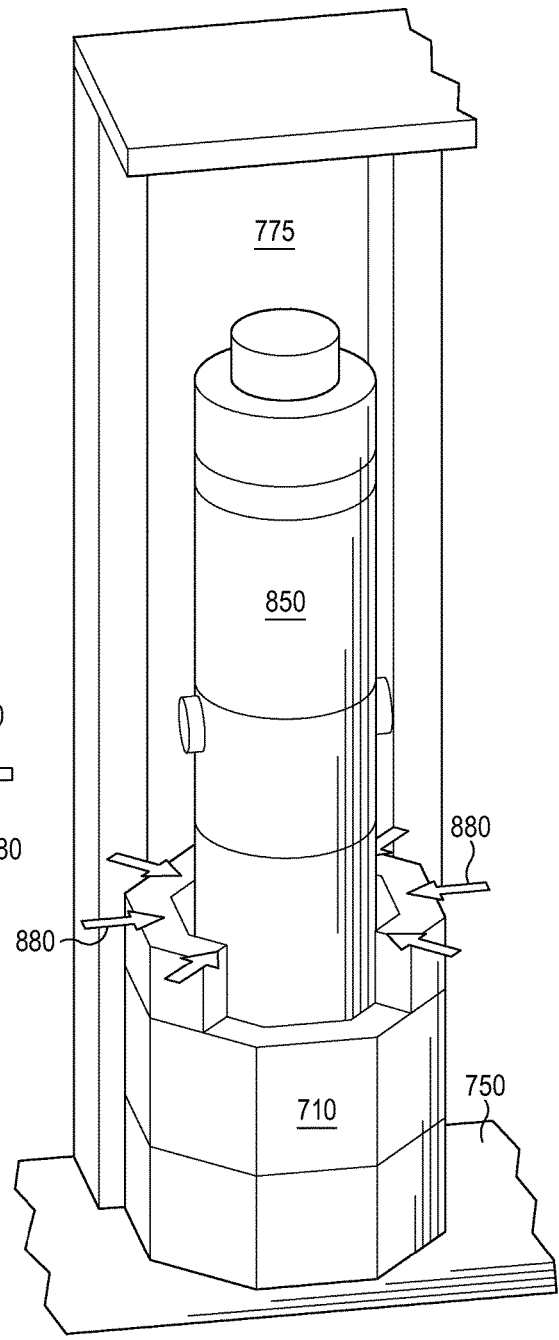
FIG. 8G illustrates the example containment vessel of FIG. 8F mounted in a support structure.

FIG. 8G illustrates the example containment vessel 850 of FIG. 8F mounted in a support structure, such as support structure 710 of FIG. 7. First support structure 710 may be attached to the one or more reactor building walls 775. As previously discussed, support structure 710 may be physically separated some distance from all of the reactor building walls 775, such that the support structures 710 may only be physically supported by reactor building floor 750. In some examples, the base support 852 (FIG. 8F) of the containment vessel 850 may be configured to be inserted into support structure 710 and rest on the reactor building floor 750.

Physically separating first support structure 710 from reactor building walls 775 may operate to effectively decouple any excitation from reactor building walls 775 to containment vessel 850 during a seismic event. For example, during a seismic event, the reactor building may have a number of different modes in the sensitive frequency range of components associated with the reactor module. By seismically isolating or decoupling the support 710 from reactor building walls 775, the peak accelerations experienced by containment vessel 850 may be limited to the dynamic forces 880 transmitted from the support structure 710.

Figure 9:
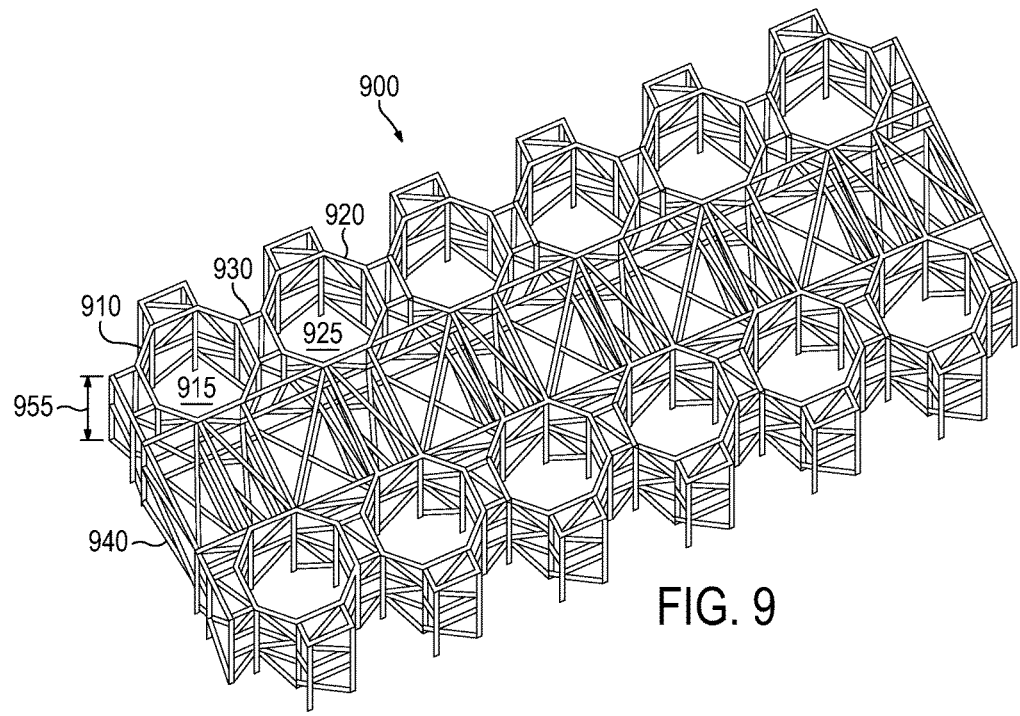
FIG. 9 illustrates yet another example support structure for one or more reactor modules.

FIG. 9 illustrates yet another example support structure 900, or super-structure, configured to hold one or more reactor modules. Support structure 900 is shown as including twelve reactor module holding sub-structures, including a first sub-structure 910 and a second sub-structure 920. In some examples, two or more rows of sub-structures may be connected by an intermediate structure 940.

First sub-structure 910 may be separated from second sub-structure 920 by a ligament structure 930. Ligament structure 930 may be configured to maintain a predetermined distance between adjacent reactor modules to provide sufficient volume and/or flow of surrounding coolant, such as water, to cool the external surface of the reactor modules. Additionally, support structure 900 may comprise a plurality of interconnected and spaced apart beams which allow for a substantially free flow of coolant through the support structure 900 and about the lower heads of the reactor modules. Support structure 900 may comprise one or more beams, girders, ribbed panels, decks, other support members, or any combination thereof, arranged in a traditional frame, a honeycomb frame, an octagonal frames, other geometric shapes, or any combination thereof.

A first reactor module receiving area 915 may be associated with first sub-structure 910, and a second reactor module receiving area 925 may be associated with second sub-structure 920. The top portion of support structure 900 may be located at a support height 955 above a reactor building floor. A portion of a reactor module commensurate with support height 955 may be supported by support structure 900. Support height 955 may correspond to the approximate location of a containment vessel flange associated with the reactor module contained within one or more receiving areas of support structure 900. In some examples, support height 955 may correspond to one or more steam generator connections or access ports of a reactor module.

A reactor module may be supported on the reactor building floor by a support skirt located within a receiving area of the support structure 900. In some examples, the weight of the reactor module may be supported directly by support structure 900, such as by first sub-structure 910, such that the lower head of the reactor module is suspended above the reactor building floor.

Figure 10:
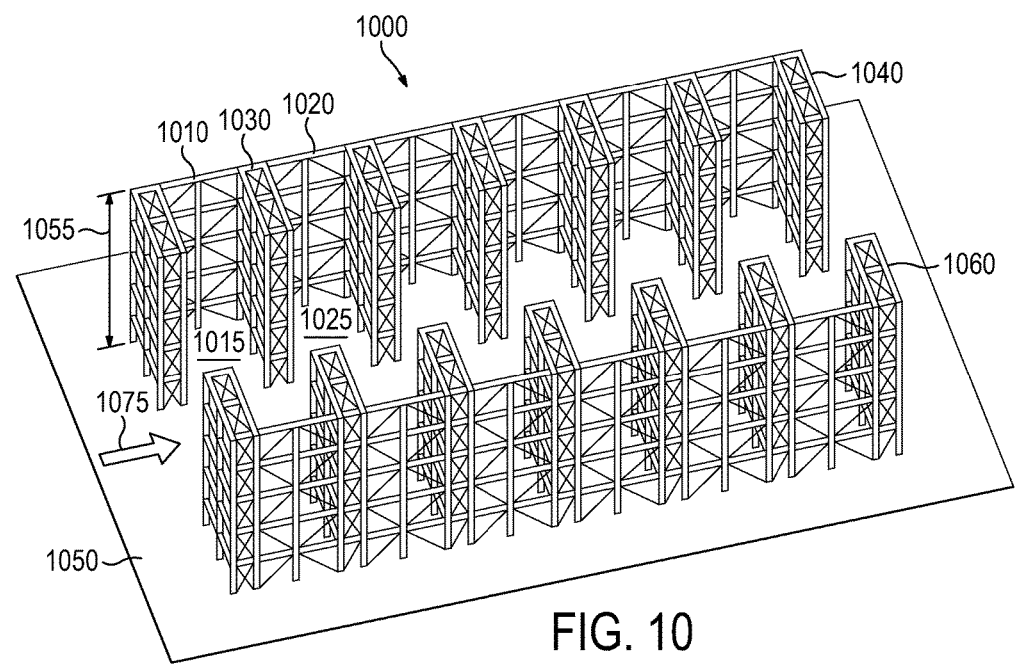
FIG. 10 illustrates a further example support structure for one or more reactor modules.

FIG. 10 illustrates a further example support structure 1000 for one or more reactor modules. Support structure 1000 is shown as including two super-structures 1040, 1060 each comprising six reactor module holding sub-structures, such as a first sub-structure 1010 and a second sub-structure 1020.

First sub-structure 1010 may be separated from second sub-structure 1020 by a ligament structure 1030 configured to maintain a predetermined distance between adjacent reactor modules. A first reactor module receiving area 1015 may be associated with first sub-structure 1010, and a second reactor module receiving area 1025 may be associated with second sub-structure 1020.

The top portion of one or both super-structure 1040, 1050 may be located at a support height 1055 above a reactor building floor 1050. A portion of a reactor module commensurate with support height 1055 may be contained within support structure 1000. Support height 1055 may correspond to the approximate location of a containment vessel flange associated with the reactor module contained within one or more receiving areas of support structure 1000. In some examples, support height 1055 may correspond to one or more steam generator connections or access ports of a reactor module.

The weight of a reactor module may be supported on reactor building floor 1050 by a support skirt located within a receiving area of the support structure 1000. In some examples, substantially the entire weight of the reactor module may be supported by support structure 1000, such as by first sub-structure 1010, such that the lower head of the reactor module is suspended above reactor building floor 1050.

One or more of the support structures, such as first sub-structure 1010 and/or second sub-structure 1020, may comprise three sides. A lateral opening or doorway in the one or more sub-structures may be configured to facilitate entry and/or removal of a reactor module from the corresponding reactor module receiving areas. Additionally, a central passageway 1075 formed between super-structures 1040, 1050 may facilitate entry and/or removal of a reactor module from structure 1000.

Figure 11:
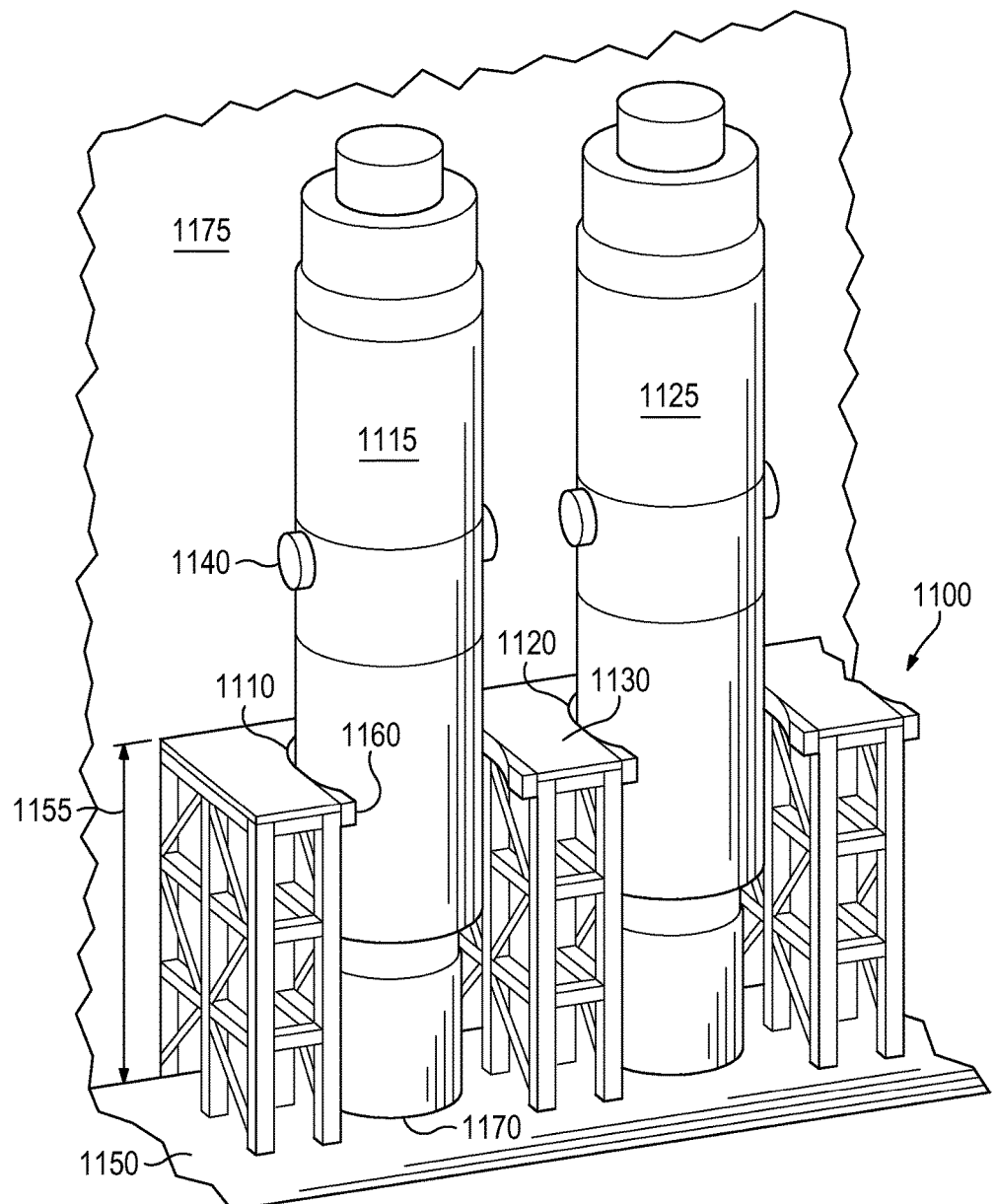
FIG. 11 illustrates a plurality of reactor modules and an example support structure in a first configuration.

FIG. 11 illustrates a plurality of reactor modules and an example support structure 1100 in a first configuration. Support structure 1100 is shown as including a first receiving area 1110 and a second receiving 1120. First receiving area 1110 may be separated from second receiving area 1120 by a ligament 1130 configured to maintain a predetermined distance between adjacent reactor modules, such as a first reactor module 1115 and a second reactor module 1125.

The top portion of support structure 1100 may be located at a support height 1155 above a reactor building floor 1150. A portion of first reactor module 1115 commensurate with support height 1155 may be located with the first receiving area 1110 of support structure 1100. Support height 1155 may correspond to the approximate location of a containment vessel flange associated with first reactor module 1115. Support height 1155 may be located at or between approximately one-fourth to one-half of the overall height of first reactor module 1115. In some examples, support height 1155 may be approximately one-third of the overall height of first reactor module 1115.

Seismic and/or dynamic forces may be transmitted from support structure 1100 to first reactor module 1115 at support height 1155. In some examples, substantially the only contact between support structure 1100 and first reactor module 1115 may occur at support height 1155.

First receiving area 1110 may be sized to receive a lower portion of first reactor module 1115. In some examples, support structure 1100 may be configured to at least partially surround the lower portion of first reactor module 1115 within first receiving area 1110. First receiving area 1110 may comprise three sides. A lateral opening or doorway in the one or more sub-structures may be configured to facilitate entry and/or removal of first reactor module 1115 from the first receiving area 1110.

A retaining member 1160 may be configured to retain first reactor module 1115 within first receiving area 1110, such as during operation of first reactor module 1115. Retaining member 1160 may be located at approximately support height 1155. Additionally, retaining member 1160 may be configured as a retaining ring or "c-ring" which may partially surround first reactor module 1115. Retaining member 1160 may be configured to prohibit or restrict a radial or lateral movement of first reactor module 1115 out of first receiving area 1110. In some examples, retaining member 1160 may be configured to prohibit or restrict a vertical movement of first reactor module 1115 such that might otherwise be experienced during a seismic event. Additionally, retaining member 1160 may be configured that allow first reactor module 1115 to be removed from first retaining area 1110 without removing second reactor module 1125 from second retaining area 1120.

First reactor module 1115 may be supported on reactor building floor 1150 by a base support or support skirt 1170 located within first receiving area 1110. Support structure 1100 may be configured to at least partially surround a lower portion of first reactor module 1115 without contacting support skirt 1170. In some examples, support structure 1100 may not be securely connected to the reactor building floor. First reactor module 1115 may be configured to tilt within support structure 1100 during the seismic event, and retaining member 1160 may be configured to contact the lower portion of first reactor module 1115 when the reactor module tilts.

A retention system comprising retaining member 1160 may be located near a top surface of support structure 1100. Retaining member 1160 may be configured to contact the lower portion of first reactor module 1115 during a seismic event. An elevation of retaining member 1160 above reactor building floor 1150 may be equal to support height 1155. In some examples, the elevation of retaining member 1160 above reactor building floor 1150 may be less than or approximately equal to one-half an overall height of first reactor module 1115.

An upper portion of first reactor module 1115 may extend above retaining member 1160 without contacting support structure 1100. In some examples, the elevation of the retention system may be approximately one-third of the overall height of first reactor module 1115. Additionally, a length of the upper portion of first reactor module 1115 may be approximately two-thirds of the overall height of first reactor module 1115. The lower portion of first reactor module 1115 may be attached to the upper portion of the reactor module by a flange. In some examples, retaining member 1160 may be configured to contact the flange during a seismic event.

A relatively small gap or spacing may exist between retaining member 1160 and first reactor module 1115 to provide a tolerance for fit-up during installation of first reactor module 1115 within first receiving area 1110. In some examples, the spacing may be approximately one-eighth of an inch to one-half of an inch. Retaining member 1160 may be configured to be retracted, rotated, removed, or otherwise moved to allow first reactor module 1115 to be removed from, or installed into, first receiving area 1110.

Support structure 1100 may be securely mounted to reactor building floor 1150. The reactor bay may comprise one or more reactor building walls 1175. Support structure 1100 may be attached to reactor building walls 1175. In other examples, support structure 1100 may be seismically isolated from, or physically separated some distance from, reactor building walls 1175, such that support structure 1100 may only be physically supported by reactor building floor 1150.

Figure 12:
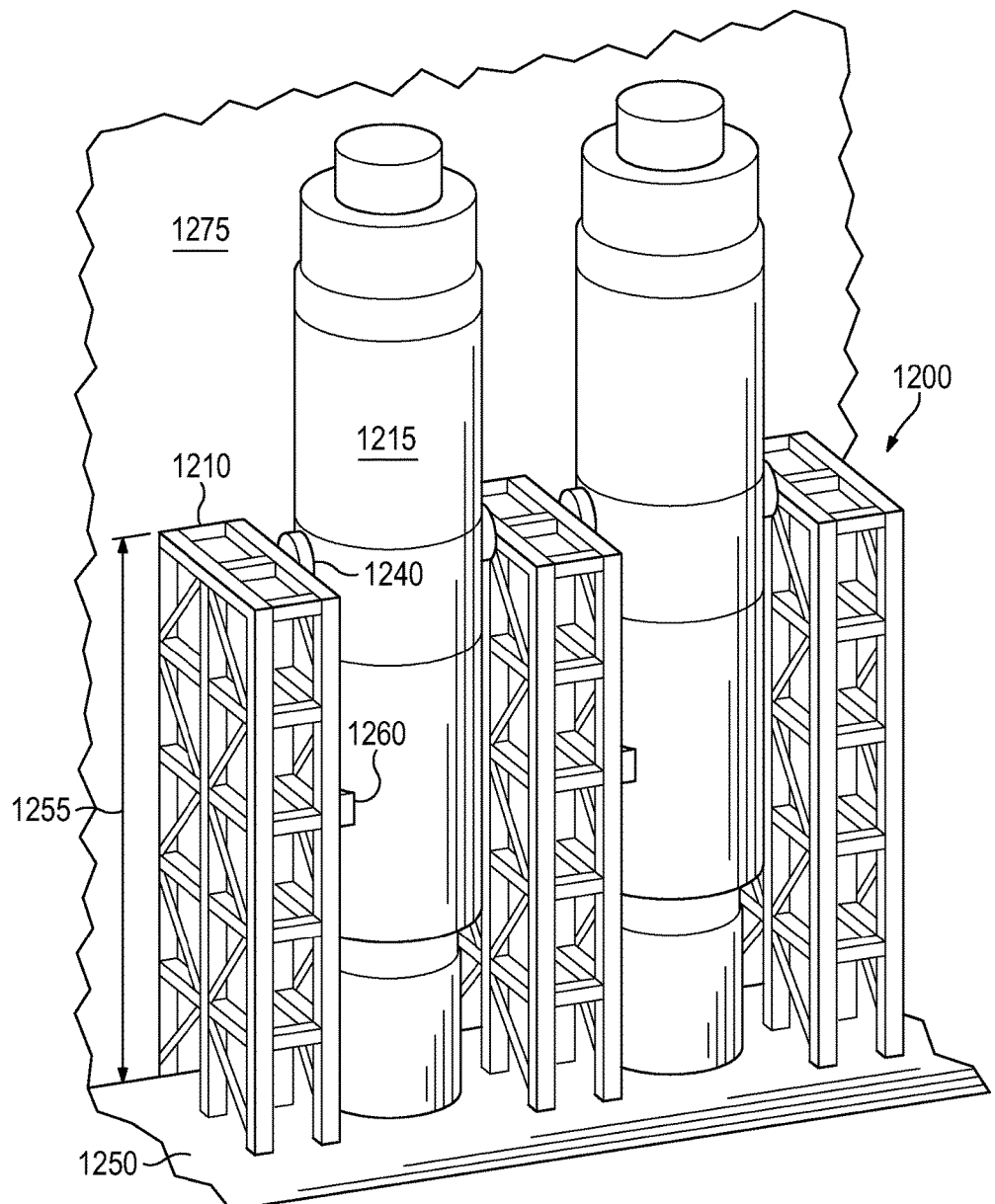
FIG. 12 illustrates a plurality of reactor modules and an example support structure in a second configuration.

FIG. 12 illustrates a plurality of reactor modules and an example support structure 1200 in a second configuration. Similarly to support structure 1100 (FIG. 11), support structure 1200 is shown as including one or more receiving areas such as receiving area 1210.

The top portion of support structure 1200 may be located at a support height 1255 above a reactor building floor 1250. A portion of a reactor module 1215 commensurate with support height 1255 may be supported by support structure 1200. Support height 1255 may correspond to one or more steam generator connections 1240 or access ports of reactor module 1215. Support height 1255 may be located at or between approximately one-half to three-fourths of the overall height of reactor module 1215. In some examples, support height 1255 may be approximately two-thirds of the overall height of reactor module 1215.

A retaining member 1260 may be configured to retain reactor module 1215 within receiving area 1210, such as during operation of reactor module 1215. Retaining member 1260 may be located at or between approximately one-fourth to one-half of the overall height of reactor module 1215. In some examples, retaining member 1260 may be located at approximately one-third of the overall height of reactor module 1215. In still other examples, retaining member 1260 may be located at approximately support height 1255.

Retaining member 1260 may be configured as a retaining ring or "c-ring" which may partially surround reactor module 1215. In some examples, a relatively small gap or spacing may exist between retaining member 1260 and reactor module 1215 to provide a tolerance for fit-up during installation of reactor module 1215 within receiving area 1210.

Support structure 1200 may be securely mounted to reactor building floor 1250. The reactor bay may comprise one or more reactor building walls 1275. Support structure 1200 may be attached to reactor building walls 1275. In other examples, support structure 1200 may be physically separated some distance from reactor building walls 1275, such that support structure 1200 may only be physically supported by reactor building floor 1250.

In addition to retaining member 1260, support structure may further comprise one or more support members similar to first support member 210 and/or second support member 220 as illustrated in FIG. 2. The one or more support members may be configured to contact an upper portion of reactor module 1215 during a seismic event and/or be located near steam generator connections 1240. In some examples, the one or more support members may be located at support height 1255.

An elevation of the one or more support members above reactor building floor 1250 may be greater than, or approximately equal to, one-half an overall height of the reactor module. An upper portion of reactor module 1215 may extend above retaining member 1260 without contacting the one or more support members and/or without contacting support structure 1200. A spacing or gap may be provided between reactor module 1215 and the one or more support members to allow for slight movement of reactor module 1215 within support structure 1200 during the seismic event. In some examples, the elevation of the one or more support members may be approximately two-thirds of the overall height of reactor module 1215, and a length of the upper portion of reactor module 1215 may be approximately one-third of the overall height of reactor module 1215.

Figure 13:
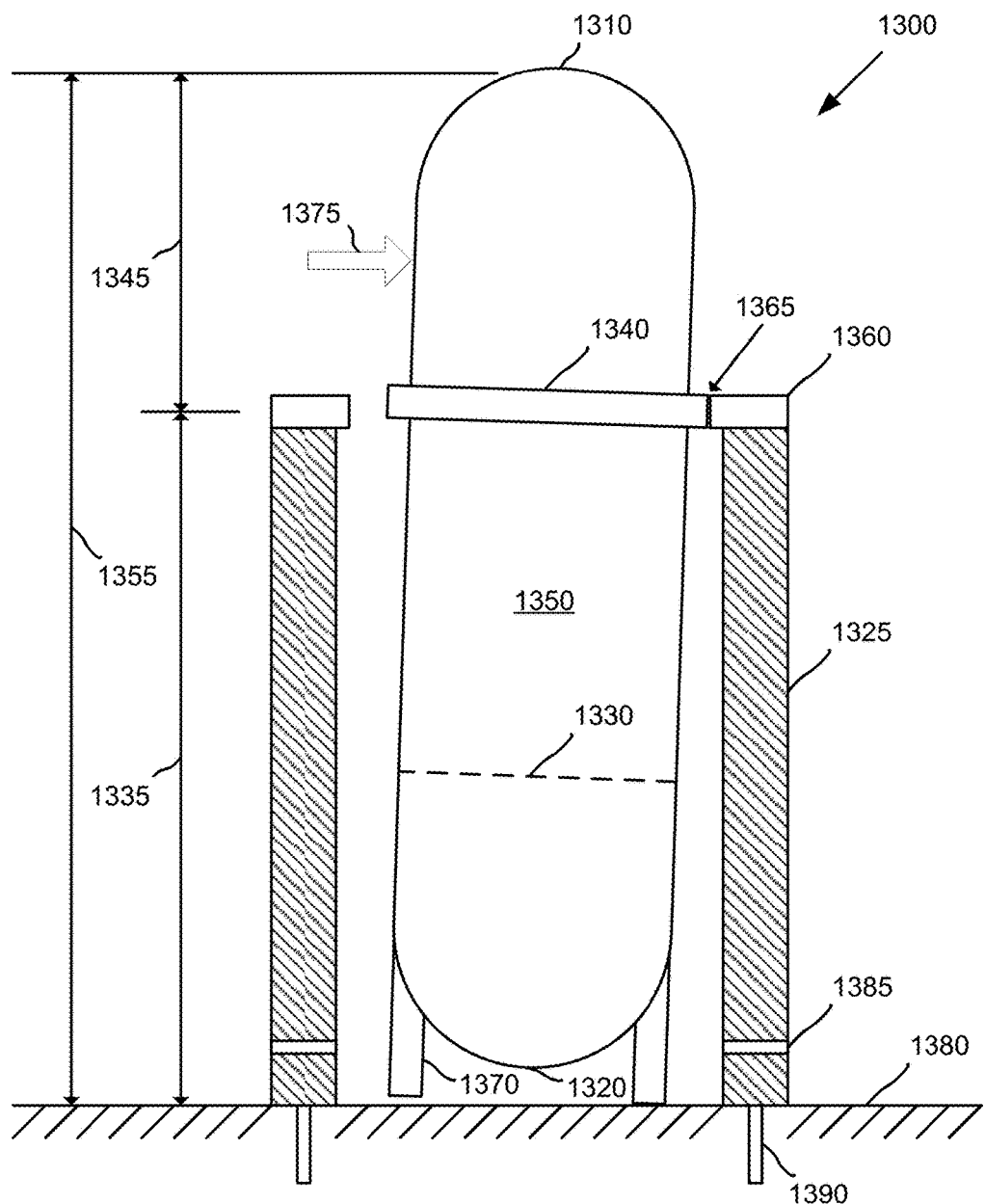
FIG. 13 illustrates an example support system with a reactor module configured in an alternate arrangement.

FIG. 13 illustrates an example support system 1300 with a reactor module 1350 configured in an alternate arrangement. Reactor module 1350 is shown in a tilted position 1375 which may be in response to a seismic event, as discussed in further detail below. Reactor module 1350 may comprise an upper containment head 1310 and a lower containment head 1320. Lower containment head 1320 may be approximately located below reference line 1330. A flange 1340 may be configured to removably attach upper containment head 1310 to the body of reactor module 1350. Lower containment head 1320 may be welded to and/or fabricated to form an integral assembly with the body of reactor module 1350. In some examples, lower containment head 1320 may also be removably attached to the body of reactor module 1350 by a flange, similar to flange 1340.

Substantially all of the weight of reactor module 1350 may be supported on a floor 1380 of a reactor building and/or a reactor bay by a base support 1370. In some examples, base support 1370 may be configured as a cylinder-shaped skirt that rests on floor 1380. Reactor module 1350 may be associated with an overall height 1355 as measured from floor 1380 to the top of upper containment head 1310.

An upper portion of reactor module 1350 located above flange 1340, including upper containment head 1310, may be associated with a length 1345 which is less than one-half of the overall height 1355 of reactor module 1350. Additionally, a lower portion of reactor module 1350, located below flange 1340, may be associated with a length 1335 which is greater than one-half of the overall height 1355 of reactor module 1350. In some examples, the length 1345 of the upper portion of reactor module 1350 may be approximately one-third of the overall height 1355, and the length 1335 of the lower portion of reactor module 1350 may be approximately two-thirds of the overall height 1355.

Reactor module 1350 may be at least partially surrounded by a containment structure 1325, shown in cross-sectional view. Containment structure 1325 may comprise one or more structures similar to that described in FIGS. 1-12, and may include an opening or entrance to facilitate installation and/or removal of reactor module 1350 from containment structure 1325, such as during a refueling operation. A retaining structure 1360 may be located at or near the top surface of containment structure 1325. Retaining structure 1360 may be configured similarly as one or more of the retaining devices, retaining members, and/or retaining systems as described with respect to the various other examples provided in FIGS. 1-12.

Containment structure 1325 may be securely attached to the floor 1380 by one or more attachment devices 1390. The one or more attachment devices 1390 may comprise bolts, weldments, concrete fabrications, other substantially rigid and/or immobile attachment devices, or any combination thereof. In some examples, attachment devices 1390 may comprise bolts, rods, or rebar that may be set into a concrete foundation of floor 1380. Additionally, containment structure 1325 may be completely covered in a pool of water. Containment structure 1325 may comprise one or more channels 1385 configured to allow passage of the water from outside of containment structure into a receiving area located within containment structure 1325 that houses reactor module 1350.

During a seismic event, such as an earthquake, seismic forces may be transmitted from the ground to reactor module 1350 via the floor 1380. In some examples, the seismic forces may cause at least a portion of base structure 1370 to lift off the floor 1380 or otherwise move. The movement of base structure 1370 may in turn cause flange 1340 to come into contact with retaining structure 1360 at one or more contact points 1365. For example, reactor module 1350 may move or tilt 1375 within the limited confines of base structure 1370 until contact is made with retaining structure 1360. Accordingly, support structure 1325 may be configured to limit the amount of movement of reactor module 1350 during a seismic event according to the initial distance or spacing between flange 1365 and retaining structure 1360 that exists when reactor module 1350 is at rest.

The composition, height, width, and other geometric and material properties of support structure 1325 may be configured to control the amplitudes and frequencies associated with the seismic forces which are transmitted to reactor module 1350 from the ground or floor 1380. In some examples, support structure 1325 is only attached to the floor 1380 such that support structure 1325 may be seismically isolated from any other structure or wall of the reactor building or reactor bay.

Figure 14:
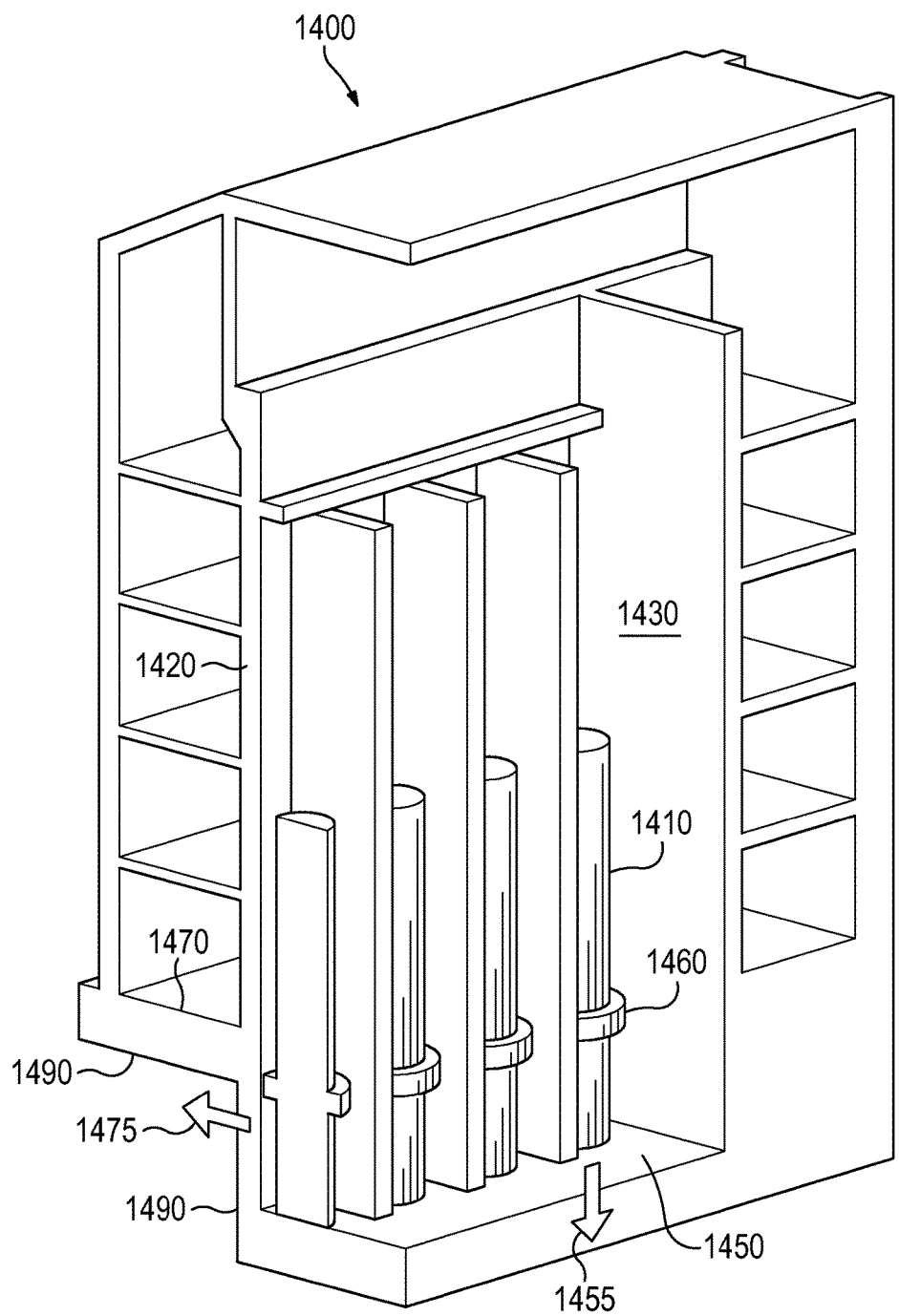
FIG. 14 illustrates an example support structure at least partially located below ground.

FIG. 14 illustrates an example reactor building 1400 with a support structure 1460 at least partially located below ground. Additionally, reactor building 1400 itself may be located at least partially below ground and may comprise multiple areas, rooms, or compartments, which in some cases may be connected and/or separated by various structures or walls 1420. As previously discussed, seismic forces transferred to a reactor module, such as reactor module 1410, may experience a cumulative increase and/or amplification in amplitude and/or frequency depending on the number and/or length of intervening structures and/or systems that the seismic forces travel in reaching reactor module 1410.

The ground may at least partially surround reactor building 1400. In some examples, seismic forces may be transferred from the ground to a reactor bay 1430 by one or more intervening structures, such as wall 1420. A reactor bay floor 1450 may be located above and/or adjacent to subterranean ground 1490. Similarly, a reactor building floor 1470 may be located above and/or adjacent to subterranean ground 1490. Accordingly, one or both of reactor bay floor 1450 and reactor building floor 1470 may be considered to provide a direct path with the ground 1490. The path may be provided essentially absent any intervening structures of reactor building 1400, at least along the path of contact, that might otherwise increase or amplify seismic forces or accelerations generated within, or transmitted by, the ground 1490.

As reactor module 1410 is supported on reactor bay floor 1450, the bottom of reactor module 1410 may be considered as having a direct vertical path 1455 with the ground 1490 located below reactor bay floor 1450. Similarly, support structure 1460 is shown as being located slightly below reactor building floor 1470, such that support structure 1460 may also be considered as having a direct horizontal path 1475 with the ground 1490 located below reactor building floor 1470. Accordingly, reactor module 1410 may be supported by reactor bay floor 1450 and by support structure 1460 to provide one or more direct paths between reactor module 1410 and the ground 1490 without any intervening structures of reactor building 1400 other than reactor bay floor 1450.

One or more of the support structures and/or systems described with respect to FIGS. 1-13 may be utilized in reactor building 1400. Although support structure 1460 is illustrated as being located at a lower half of reactor module 1410, in some examples, a support structure may be located at an upper half of the reactor module. For example, the support structure could be located at or near a flange used to mount a top containment head to the body of the reactor module. In that case, an upper portion of the reactor module could be defined as comprising the upper containment head of the reactor module, and a lower portion of the reactor module could be defined as comprising the reactor module body and/or the lower containment head located below the upper flange.

Figure 15:
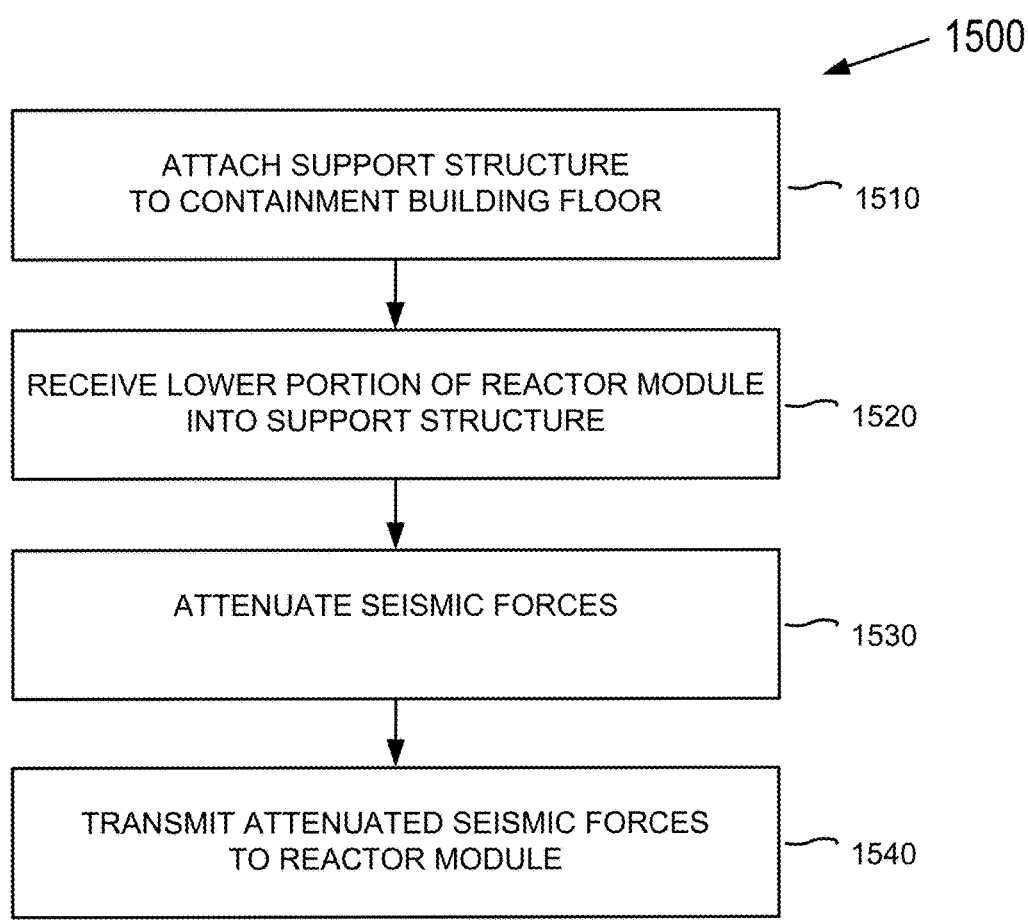
FIG. 15 illustrates an example process for supporting one or more reactor modules.

FIG. 15 illustrates an example process for supporting one or more reactor modules. A support structure for attenuating seismic forces on a reactor module may be housed in a reactor building having a floor and a plurality of walls. At operation 1510, the support structure may be securely attached to the reactor building floor. The support structure may be securely attached to the floor by a mounting structure including one or more bolts, rods, rebar, weldments, concrete fabrications, other attachment devices, or any combination thereof.

In some examples, the support structure may be seismically isolated from all of the reactor building walls and/or reactor bay walls which may surround, or partially surround, the reactor module. Similarly, the support structure may be seismically isolated from any ceiling or overhead structure associated with the reactor building or the reactor bay. In some examples, the support structure is only attached to the building floor or to the reactor bay floor.

At operation 1520, a lower portion of a reactor module may be received into a receiving area of the support structure. The support structure may be configured to at least partially surround the lower portion of the reactor module within the means for receiving, such that an upper portion of the reactor module may extend above the top surface of the support structure. In some examples, the upper portion of the reactor module may extend above the top surface without contacting the support structure.

The support structure may comprise a plurality of receiving areas for a number of reactor modules housed in the reactor building. For example, the reactor building may comprise a plurality of integral and/or adjacent reactor bays. In some examples, the support structure may comprise six or more receiving areas for housing six or more corresponding reactor modules.

The plurality of receiving areas may be rigidly connected to each other via the support structure. Additionally, the receiving areas may be spaced apart from each other to provide a predetermined distance between adjacent reactor modules that allows a coolant, such as water, to form a thermal and/or neutronic shielding between the reactor modules. The support structure, and at least a portion of each reactor module(s) housed therein, may be covered by a pool of water within the reactor building.

At operation 1530, seismic forces transmitted through the reactor building floor may be attenuated by a retention system located at or near the top surface of the support structure. In some examples, the retention system may comprise the inner edge or the inner circumference of the upper surface of the support structure. In other examples, the retention system may comprise one or more support members or retention devices mounted to the support structure. The retention system may be configured as a "c-ring" shaped structure which at least partially surrounds the exterior surface and/or flange of the reactor module.

The retention system may be configured to contact the lower portion and/or flange of the reactor module during a seismic event. An elevation associated with the retention system and/or top surface of the support structure above the reactor building floor may be approximately equal to, or less than, one-half of the overall height of the reactor module. In some examples, the height of the retention system may be approximately one-third the overall height of the reactor module. An upper portion of the reactor module may be above the retention system without contacting the support structure.

At operation 1540, seismic forces may be transmitted to the reactor module after being attenuated at operation 1530. In some examples, the reactor module may comprise a base support or base skirt which may be configured to support substantially all of the weight of the reactor module. In some examples, the reactor module and/or base support is not rigidly attached to any exterior structure, such that the reactor module may experience some freedom of movement in one or more directions. The reactor module may be configured to pivot, tilt, or tip about the base support such that the reactor module and/or flange of the reactor module may come into contact with an upper portion of the support structure.

One or more of the support structures described herein may be configured to both support a reactor module and reduce the number of dominant modes in the sensitive frequency range during a seismic event. One or more aspect or features of the support structures may be configured or arranged to design individual components associated with the rector module away from those frequencies. Additionally, tying one or more of the support structures to the reactor building floor may operate to reduce and/or limit any excitation or acceleration of the reactor module and/or components.

One or more of the support structures described herein may be manufactured in a shop environment in a modular fashion, which may reduce construction time and cost. Additionally, one or more of the support structure designs may be configured to optimize rigidity while minimizing overturning moment of the reactor module relative to the reactor building floor.

In addition to operating with a pressurized water reactor and/or a light water reactor, it should be apparent to one skilled in the art that at least some of the examples provided herein may be understood to also apply to other types of power systems. For example, one or more of the examples or variations thereof may also be made operable with a boiling water reactor, sodium liquid metal reactor, gas cooled reactor, pebble-bed reactor, and/or other types of reactor designs.

It should further be noted that any rates and values described herein are provided by way of example only. Other rates and values may be determined through experimentation such as by construction of full scale or scaled models of a nuclear reactor system. Additionally, whereas certain example structures are described as comprising steel or concrete, other structural materials may be used instead of, or in combination with, the example materials.

Having described and illustrated various examples herein, it should be apparent that other examples may be modified in arrangement and detail. We claim all modifications and variations coming within the spirit and scope of the following claims.

The invention claimed is:

1. A system for attenuating seismic forces in a nuclear reactor module comprising an inner nuclear reactor pressure vessel surrounded by an outer containment vessel, the outer containment vessel including a first portion and a second portion detachably connected to and extending above a top end of the first portion, and containment vessel extensions extending outward from an outside surface of the outer containment vessel, the system comprising:
   a reactor building comprising a reactor building floor; and
   a support structure securely connected to the reactor building floor, wherein the support structure comprises:
      a receiving structure including walls extending up from the reactor building floor along an outside of the first portion of the outer containment vessel and at least partially surrounding the first portion of the outer containment vessel, and
      a retention system comprising support members extending inward from an inner surface of the walls of the receiving structure, wherein
         distal ends of the support members are spaced apart and disconnected from the outer containment vessel and configured to contact the outer containment vessel during a seismic event, and wherein pairs of the support members extend along opposite lateral sides of the containment vessel extensions.

2. The system of claim 1, wherein an elevation of the support members above the reactor building floor is less than one-half an overall height of the outer containment vessel, and wherein the second portion of the outer containment vessel extends above the retention system without contacting the support structure during the seismic event.

3. The system of claim 2, wherein the support members are configured to restrict a circumferential rotation of the containment vessel about its longitudinal axis and restrict a radial movement of the containment vessel towards the walls of the receiving structure.

4. The system of claim 1, wherein the first portion of the outer containment vessel is detachably connected to the second portion of the outer containment vessel by a flange, and wherein the retention system is configured to contact the flange during the seismic event.

5. The system of claim 1, wherein the reactor module comprises a base support that rests on the reactor building floor, and wherein the support structure is configured to at least partially surround the lower portion of the reactor module without contacting the base support.

6. The system of claim 5, wherein the base support is not securely connected to the reactor building floor, wherein the reactor module is configured to tilt within the support structure during the seismic event, and wherein the retention system is configured to contact the lower portion of the reactor module when the reactor module tilts.

7. The system of claim 1 wherein the one or more support members are configured to contact the second portion of the outer containment vessel during the seismic event.

8. The system of claim 7, wherein the one or more support members are located near a steam generator connection that passes through the outer containment vessel.

9. The system of claim 7, wherein an elevation of the one or more support members above the reactor building floor is greater than or equal to one-half an overall height of the reactor module, and wherein the second portion of the outer containment vessel extends above the one or more support members.

10. The system of claim 9, wherein the elevation of the one or more support members is two-thirds of the overall height of the reactor module, and wherein a length of the second portion of the outer containment vessel is one-third of the overall height of the reactor module.

11. A support structure for attenuating seismic forces in one or more nuclear reactor modules housed in a reactor building, wherein at least some of the nuclear reactor modules comprise an inner nuclear reactor pressure vessel surrounded by an outer containment vessel, the outer containment vessel includes a first portion and a second portion detachably connected to and extending above a top end of the first portion, and a containment vessel extension extends outward from an outside surface of the outer containment vessel, the support structure comprising:
  a receiving structure including walls extending up from a floor of the reactor building and at least partially surrounding the first portion of the outer containment vessel, and
  a retention system comprising a support member located near a top inner surface of one of the walls of the receiving structure, wherein:
    a distal end of the support member is spaced and disconnected from the outer containment vessel and the support member extends along a lateral side of the containment vessel extension;
    the support member is configured to contact the outer containment vessel during a seismic event and to restrict a radial movement of the outer containment vessel; and
    the support member is configured to contact the lateral side of the containment vessel extension during the seismic event and restrict a circumferential rotation of the outer containment vessel.

12. The support structure of claim 11, further comprising:
  a first receiving structure configured to receive a first reactor module housed in the reactor building;
  a second receiving structure configured to receive a second reactor module housed in the reactor building; and
  a ligament structure that connects the first receiving structure to the second receiving structure, wherein the ligament structure is configured to maintain a minimum spacing between the first reactor module and the second reactor module.

13. The support structure of claim 12, wherein the retention system is configured to allow the first reactor module to be removed from the support structure without removing the second reactor module.

14. The support structure of claim 11, wherein the first portion of the outer containment vessel is removably connected to the second portion of the outer containment vessel at a flange.

15. The support structure of claim 11, wherein the receiving structure comprises a recessed space sized to fit the first portion of the outer containment vessel that is lowered into the support structure.

16. The support structure of claim 15, wherein the recessed space forms a substantially cylindrical shaped receiving area that extends from a top surface of the receiving structure to the floor of the reactor building.

17. The support structure of claim 15, wherein the recessed space is formed by five or more contiguous walls of the receiving structure.

18. The support structure of claim 15, wherein the receiving structure walls extend around three sides of the outer containment vessel.

19. A support structure for attenuating seismic forces on a nuclear reactor module housed in a reactor building having a floor, the nuclear reactor module including an inner nuclear reactor pressure vessel surrounded by an outer containment vessel, and the outer containment vessel including a first portion and a second portion detachably connected to and extending above a top end of the first portion, and containment vessel extensions extending radially outward from the outer containment vessel, the support structure comprising:
  a base structure supporting the nuclear reactor module on the reactor building floor;
  walls surrounding at least partially the first portion of the outer containment vessel and extending up from the reactor building floor; and
  multiple pairs of spaced apart support members, each pair extending out from one of the walls with the support members of each pair extending along opposite lateral sides of the containment vessel extensions, wherein each of the support members:
  have distal ends spaced apart and disconnected from the outer containment vessel and configured to contact the outer containment vessel during a seismic event and restrict a radial movement of the outer containment vessel; and are further configured to contact the lateral sides of the containment vessel extensions during the seismic event and restrict a circumferential rotation of the outer containment vessel.

20. The apparatus of claim 19, wherein an elevation of the support members is located at an elevation above the reactor building floor equal to or less than one-half of an overall height of the outer containment vessel, and wherein the second portion of the outer containment vessel extends above the support members without contacting the support structure during the seismic event.

* * * * *